United States Patent
Coric et al.

(10) Patent No.: US 8,938,072 B2
(45) Date of Patent: Jan. 20, 2015

(54) CRYPTOGRAPHIC KEY DERIVATION DEVICE AND METHOD THEREFOR

(71) Applicants: Srdjan Coric, Gilbert, AZ (US); Steven D. Millman, Gilbert, AZ (US)

(72) Inventors: Srdjan Coric, Gilbert, AZ (US); Steven D. Millman, Gilbert, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 84 days.

(21) Appl. No.: 13/750,956

(22) Filed: Jan. 25, 2013

(65) Prior Publication Data

US 2014/0211942 A1  Jul. 31, 2014

(51) Int. Cl.
*H04L 9/08* (2006.01)
*G06F 9/30* (2006.01)

(52) U.S. Cl.
CPC .............. *H04L 9/08* (2013.01); *H04L 9/0877* (2013.01); *H04L 9/0861* (2013.01); *G06F 9/30003* (2013.01); *G06F 9/30181* (2013.01)
USPC .............................. 380/44; 380/277; 712/226

(58) Field of Classification Search
CPC ............ G06F 21/70–21/72; H04L 9/08; H04L 9/0861; H04L 9/0877
See application file for complete search history.

(56) References Cited

U.S. PATENT DOCUMENTS

| | | | |
|---|---|---|---|
| 7,400,722 B2 * | 7/2008 | Qi et al. | 380/28 |
| 7,773,754 B2 * | 8/2010 | Buer et al. | 380/277 |
| 8,060,755 B2 | 11/2011 | Henry et al. | |
| 8,332,931 B1 * | 12/2012 | Tran et al. | 726/17 |
| 8,484,486 B2 * | 7/2013 | Deierling et al. | 713/193 |
| 2004/0184607 A1 * | 9/2004 | Chang et al. | 380/45 |
| 2012/0011351 A1 * | 1/2012 | Mundra et al. | 713/1 |

* cited by examiner

*Primary Examiner* — Tae Kim
*Assistant Examiner* — Louis Teng
(74) *Attorney, Agent, or Firm* — Schmeiser, Olsen & Watts LLP; Lowell W. Gresham

(57) ABSTRACT

A data processing system includes a cryptographic processing module providing for cryptographic key generation. A method entails computing derived keys one time, during a first execution of a key generation process, such that they may subsequently be utilized for processing large quantities of data without being re-computed. The derived keys provide for the efficient cryptographic processing of data, including data frames.

20 Claims, 8 Drawing Sheets

CRYPTOGRAPHIC KEY DERIVATION DEVICE AND METHOD THEREFOR

TECHNICAL FIELD OF THE INVENTION

The present invention generally relates to data security in electronic data processing devices. More specifically, the present invention relates to a data processing device which generates derived keys for use in cryptographic and data processing operations.

BACKGROUND OF THE INVENTION

Some data processing systems have a need to achieve data security and engage in secure operations from time to time. In general, such secure operations are concerned with authenticating users and/or data, authorizing users and/or data, and securely communicating data. Data security and secure operations may be achieved in part by performing a variety of cryptographic operations on data objects. Cryptographic operations typically use keys to perform cryptographic operations on data being processed by the data processing system. Depending on the nature of the cryptographic operations being performed and on protocols being processed, private keys, public keys, and/or a combination of both private and public keys may be employed. In some operations, a large number of keys may be required to process the data.

BRIEF DESCRIPTION OF THE DRAWINGS

A more complete understanding of the present invention may be derived by referring to the detailed description and claims when considered in connection with the Figures (not necessarily drawn to scale), wherein like reference numbers refer to similar items throughout the Figures, and:

DETAILED DESCRIPTION

Figure 1:
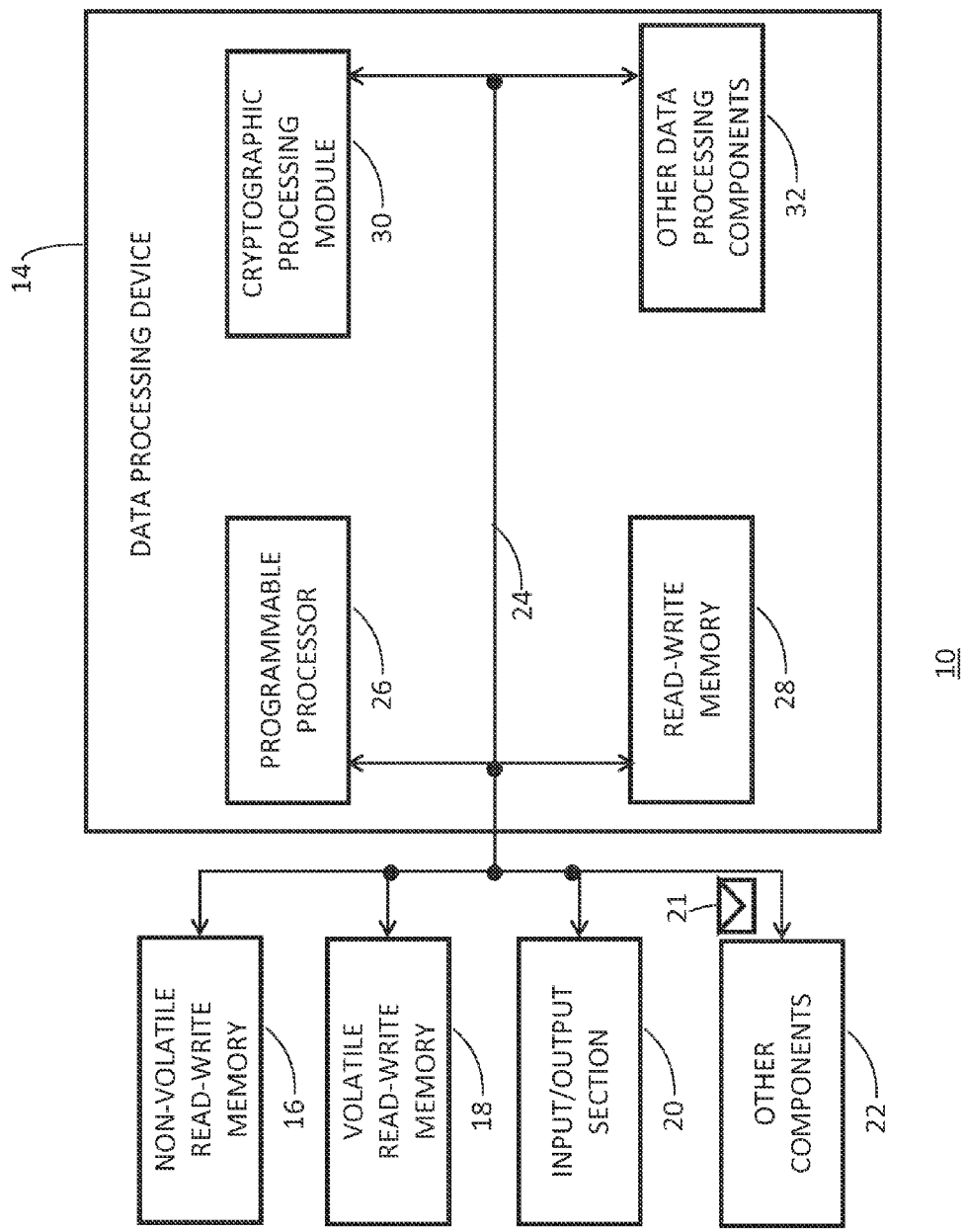
FIG. 1 shows a block diagram of a data processing system configured in accordance with the teaching of an embodiment.

Using and processing large numbers of keys to make them available to, and useful for, data processing operations, can require a significant amount of processing power in the system being utilized to process the keys. Due to the nature of data being communicated, it may be essential that keys be processed as effectively and efficiently as possible. Keys used in such data processing operations may need to be cryptographically processed prior using with the data.

In order to perform cryptographic operations, which may be computationally intensive, many data processing systems employ dedicated security circuitry and/or modules to specifically handle the execution of the cryptographic operations and functions, in effect offloading the main processor of the data processing system from this task, and allowing that main processor to focus on other tasks. This may allow the data processing system to better keep up with the processing required for data, such as, for example, packets being received by the data processing system. Absent dedicated circuitry and/or cryptographic modules, many data processing systems would suffer from unacceptable delays in processing incoming data.

In order for a cryptographic operation to be performed, both information about the data to be processed, and keys to be used in processing the data, must be available to the module and/or circuit performing the cryptographic operation. Regardless of how the keys are ultimately made available to the security module and/or devices utilizing the keys, the security module and/or device ultimately may use those keys to cryptographically process data received by the system and corresponding to those keys.

Some cryptographic operations, such as, for example, cryptographic operations associated with Internet Protocol Security (IPSEC) or SSL protocols, may require that these keys be further processed before a security module and/or device can carry out a required cryptographic operation on incoming corresponding data. A variety of algorithmic techniques may be used to further process and transform the original keys so that the keys are usable to perform a given cryptographic operation. These algorithmic techniques typically employ mathematical operations to transform the original keys into altered keys. This additional processing of keys requires additional processing time, and may induce delays while the security module and/or device waits for the keys to be further processed into an acceptable form such that they may be employed during the crytographic operation. This is especially true when it is understood that many independent keys may be employed for various cryptographic operations and multiple data objects, meaning that in some cases, each of those keys associated with a given data object would need to be transformed to be useable in a given cryptographic operation for the associated data. For example, a vast number of independent keys may be required for applications and data processing systems like secure high-capacity routers and servers. These applications are capable of simultaneously supporting a vast number of communication sessions or other data object domains for a vast number of clients. When a data processing device or application repeatedly requires that a cryptographic operation be performed on a vast amount of data, such as packets, and that cryptographic operation requires that unique keys used to process each of those packet streams each be transformed prior to the cryptographic operation, system performance can clearly suffer.

In addition to the added processing time required to transform a key, because the additional processing of the keys takes an unknown amount of time, additional handshaking complexities and delays are created. This is because other system devices must typically communicate with the modules transforming the keys in order to know when the transformed keys are available for use and cryptographic processing can begin. This handshaking can also make software associated with the data processing system unnecessarily complex.

Because time is of the essence in most data processing systems, and unnecessary delays in processing packets can result in lost data, errors, dropped packets, decreased system quality, and decreased system processing throughput, this need to additionally transform keys is problematic. Furthermore, the need for programmers writing software for such systems to understand details about implementation, low-level commands, latencies, transformational processing and handshaking associated with that additional processing, can make software development unnecessarily complex, circuit/module specific, and sub-optimal.

Accordingly, embodiments entail a security key derivation module and method that efficiently, effectively transforms keys, such that the resulting keys are readily available to cryptographic engines without unnecessary delay, and without, in some embodiments, unnecessary and burdensome handshaking and software complexities. Providing transformed security keys avoids the delays and complexities associated with conventional cryptographic security techniques, allowing the underlying data processing system to process data more efficiently, deliver higher throughput rates, and deliver higher data processing quality.

FIG. 1 shows a block diagram of a data processing system 10 configured in accordance with the teaching of an embodiment. Data processing system 10 may be configured for any of a wide variety of different data-processing applications including, but not limited to, a personal computer, workstation, server, laptop computer, handheld computer, music, video or other digital media player, cell phone, router, modem, industrial controller or DRM player.

Data processing system 10 comprises non-volatile read-write memory 16, volatile read-write memory 18, an input/output section 20, a data processing device 14, and other components 22 of a type and configuration understood to those skilled in the art of data processing and computerized devices. Memory 16, memory 18, section 20, and other components 22 couple together and to data processing device 14 through a bus 24 that conveys data, addresses and control signals.

Data processing device 14 comprises a programmable processor 26, read-write memory 28, a cryptographic processing module 30, and other data processing components 32, which couple to one another through one or more data busses 24. Programmable processor 26 may be viewed as a central processing unit (CPU), processor, controller, microcontroller, microprocessor, or the like. In one embodiment, programmable processor 26 is a single core processor. However, in other embodiments, programmable processor 26 is a multi-core processor. Programmable processor 26 may, but is not required to, be the only programmable processor for data processing device 14. A programmable processor 26 differs from an unprogrammable processor in that the software, programming instructions, or code it executes may be changed or augmented in some way after data processing system 10 and data processing device 14 have been manufactured. In an embodiment, read-write memory 28 may be non-volatile read-write memory, such as, for example, flash memory. In an alternate embodiment, read-write memory 28 may be volatile read-write memory, such as, for example, dynamic random access memory (DRAM).

Each of programmable processor 26, read-write memory 28, other data processing components 32, and data busses 24 may be configured and operate in a conventional manner. Thus, read-write memory 28 may include any amount of memory configured for read and write operations. Computer software instructions for execution by programmable processor 26 and data for processing by programmable processor 26 may be stored in read-write memory 28, or may be considered to be a part of programmable processor 26. Programmable processor 26 executes any number of different computer software programs and processes data in accordance with the dictates of the programs.

Data busses 24 are used in moving data into and out of data processing device 14. For example, input/output section 20 may provide data to/from data processing device 14. Input/output section 20 may comprise such items as a keyboard, pointing device, microphone, camera, card reader, barcode reader, printer, display, speaker, and the like. In addition, other components 22 may provide data to/from data processing device 14. Other components 22 may also or alternatively include such items as a wireless interface, a network interface, universal serial bus (USB) port, Firewire port, public switched telecommunication network (PSTN) interface, or the like.

FIG. 1 also shows a data frame 21. Data frame 21 includes data to be processed by data processing system 10. In an embodiment, data frame 21 is an input frame including both key information and packet data. In an alternative embodiment, data frame 21 includes only packet data to be processed, and does not include key information. In an embodiment, data frame 21 is a data frame received via other components 22, such as, for example, a network device. Data frame 21 is shown being provided on bus 24 to other elements of data processing system 10.

Figure 2:
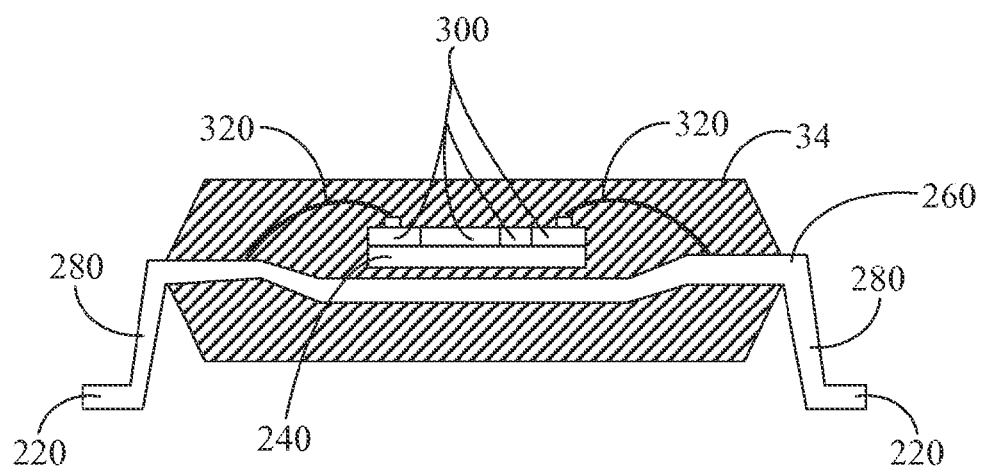
FIG. 2 shows a cross-sectional, side-view representation of a data processing integrated circuit used in accordance with the teaching of an embodiment.

FIG. 2 shows a cross-sectional, side-view representation of data processing device 14 according to an alternate embodiment of the present invention. In this embodiment, data busses 24, programmable processor 26, read-write memory 28, other data processing components 32, and cryptographic processing module 30, collectively referred to as electronic circuits 300 in this embodiment, are all formed together on a common semiconductor substrate and are packaged together and reside within a single integrated circuit 34. In other embodiments, data processing device 14 may be implemented on multiple dies and/or as multiple integrated circuits. Integrated circuit 34 is desirably produced in accordance with conventional, low cost integrated circuit processing techniques. Such techniques are well established and promote the low cost nature of integrated circuit 34, which likewise promotes a low cost characteristic for data processing system 10 (FIG. 1).

Integrated circuit 34 includes a substrate 240 attached to a leadframe 260. Leadframe 260 includes any number of pins 280, one or more of which serve as a data port 220 for moving data and other information and signals into and out from integrated circuit 34.

Substrate 240 may be provided by any type of substrate on which electronic circuits 300 are formed in accordance with semiconductor integrated circuit processing techniques known to those skilled in the art. Hence, substrate 240 is a semiconductor, integrated circuit substrate. Electronic circuits 300 need not be formed directly in contact with substrate 240 but may also be formed on or above other layers that more directly reside on substrate 240.

Some of electronic circuits 300 electrically couple to pins 280 through wire bonds 320 or using any other technique known to those skilled in the art. Substrate 240, including all electronic circuits 300 directly or indirectly formed thereon, is embedded within integrated circuit 34 in a manner known to those skilled in the art, and preferably in accordance with one of the lower cost techniques which encapsulates substrate 240 in a polymeric material, such as an epoxy or plastic. Pins 280 protrude from integrated circuit 34 and are measurable using conductive electronic probes, by coupling pins 280 to other electronic components, or in any other way known to those of skill in the art.

Those skilled in the art will appreciate that nothing requires integrated circuit 34 to be formed in the shape depicted in FIG. 2 or using the type of pin structure depicted in FIG. 2. Any of the wide variety of packages and pin structures known in the art may be adopted in manufacturing integrated circuit 34. Likewise, nothing requires substrate 240 to be formed in a single monolithic section. Rather multiple sections may be provided for substrate 240 with all such sections embedded within integrated circuit 34.

Figure 3:
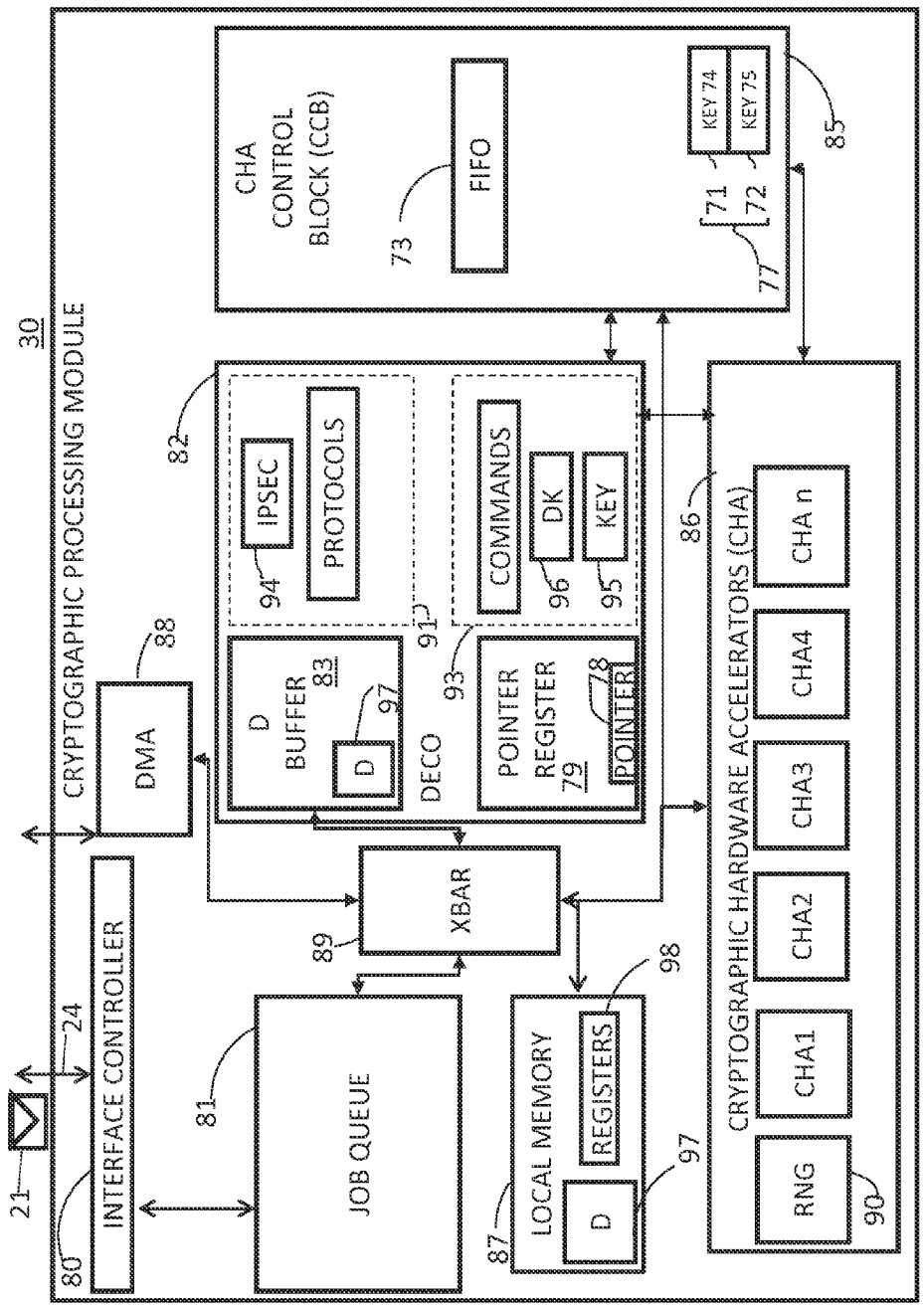
FIG. 3 shows a block diagram of a cryptographic processing module of the data processing device depicted in FIG. 1.

FIG. 3 shows a block diagram of a cryptographic processing module 30 of the data processing device 14, according to the embodiment of FIG. 1. Among other things, cryptographic processing module 30 provides data security services, including the encryption and decryption of data, for data processing device 14, and consequently, for data processing system 10. In the present embodiment, cryptographic processing module 30 comprises an interface controller 80 configured to electronically couple cryptographic processing module 30 to other electronic elements of data processing device 14, such as programmable processor 26 (FIG. 1), read-write memory 28 (FIG. 1), and other data processing device components 32 (FIG. 1) of data processing system 10 such that data, commands and other electronic information may be shared between cryptographic processing module 30 and the other electronic elements of data processing device 14 and data processing system 10. FIG. 1 also shows a data frame 21. Data frame 21 includes data to be processed by cryptographic processing module 30.

Cryptographic processing module 30 further comprises a job queue 81 electronically coupled to interface controller 80 and a crossbar bus 89. Crossbar bus 89 is electronically coupled to other elements of cryptographic processing module 30, and is configured to allow data, commands and other electronic information to flow among, and be shared among, the other electronic elements of cryptographic processing module 30. In the present embodiment, crossbar bus 89 is a switch configured to share electronic information among the various electronics elements coupled to crossbar bus 89.

Crossbar bus 89 is further coupled to local memory 87. In an embodiment, local memory 87 is secured random access memory, meaning that the memory can be read from and written to by circuitry coupled to crossbar bus 89, but may not be read from or written to by circuitry physically external to cryptographic processing module 30. In an alternative embodiment, local memory 87 is unsecured random access memory that can be read from or written to by circuitry physically external to cryptographic processing module 30. In yet another alternate embodiment, local memory 87 may be non-volatile memory. Local memory 87 is shown having storage registers 98 defined within local memory 87 in which data are stored while being utilized by other components of cryptographic processing module 30. Local memory 87 is further shown having a descriptor 97 (discussed infra) stored therein.

Crossbar bus 89 is further shown coupled to a descriptor controller (DECO) 82, and a descriptor buffer 83 of DECO 82 (described infra). Crossbar bus 89 is also shown coupled to a direct memory access (DMA) controller 88, which is configured to directly access memory external to cryptographic processing module 30. Finally, crossbar bus 89 is also shown coupled to cryptographic hardware accelerators 86 (described infra), and CHA Control Block (CCB) 85.

Continuing to refer to FIG. 3, job queue 81 is implemented using a microprocessor, microcontroller, state machine, or similar structure, and is configured to receive commands and data (including descriptors 97, which include commands) from interface controller 80 via data busses 24, prioritize those instructions and data to determine the order in which the data and instructions are to be processed, and to then pass the data and instructions on in the determined order to DECO 82 via crossbar bus 89 for processing.

DECO 82, as generally illustrated in FIG. 3, includes a descriptor buffer 83 for storing instructions and data received from job queue 81 and making those instructions and data accessible to DECO 82 as DECO 82 processes those instructions and data. In an embodiment generally illustrated in FIG. 3, DECO 82 is a microcontroller comprising volatile and non-volatile memory. In an alternate embodiment, DECO 82 is implemented using a microprocessor, state machine, or similar structure. In the present embodiment, DECO 82 includes a pointer register 79 containing data 78 (referred to as a pointer 78) that indicates (points to) a location in the descriptor buffer 83 where DECO 82 is to resume processing or accessing data when it is next able to process data and/or commands present in the descriptor buffer 83. DECO 82 is configured to process both commands that may be present in the descriptor buffer 83, and various series of commands, referred to herein as protocols, present in DECO 82, both of which are discussed below.

DECO 82 further includes commands 93. Commands 93 are each configured to perform a specific function when processed by DECO 82. Examples of commands 93 include commands to load data, commands to move data, commands to jump to a new execution location, commands to assign a certain algorithm to run in a cryptographic hardware accelerator (CHA), and commands to cause a protocol to be executed. DECO 82 is further shown including two specific command 93, a KEY command 95, and a derive key (DK) command 96. When processed by DECO 82, KEY command 95 is configured to cause a key to be loaded into a specific location such that it is available for later processing. When processed by DECO 82, DK command 96 is configured to, among other things, cause a key to be derived and made available for later processing. It should be noted that although DK command 96 is referred to as a command, it is treated more like a protocol in operation, since the DK command itself includes a number of commands 93 and operates similar to a protocol 91. In processing various commands 93, DECO 82 may use data provided to DECO 82 by other devices to which DECO 82 is electronically coupled. In an embodiment, each command 93 is physically implemented in hardware of DECO 82 using state machines, logic gates and other circuitry, and may not be altered once the DECO 82 has been manufactured.

DECO 82 further includes multiple protocols 91. Each protocol 91 includes a series of commands 93 that are processed by DECO 82, and may further include data. Each protocol 91 may vary in length and complexity based on the operation it is intended to carry out, and protocols may contain few or many commands 93. In an embodiment, each protocol 91 is physically implemented in hardware of DECO 82 using state machines, logic gates and other circuitry, and may not be altered once the DECO 82 has been manufactured. In an embodiment, a protocol 91 is a state machine configured to feed a predetermined set of commands necessary to implement a certain protocol to DECO 82 for execution. DECO 82 is further shown including a specific protocol 91, Internet Protocol Security (IPSEC) protocol 94. IPSEC protocol 94 is configured to carry out an IPSEC algorithm on data being processed by cryptographic processing module 30.

DECO 82 is configured such that if one of the commands 93 it is processing from the descriptor buffer 83 is a protocol command 91, DECO 82 stops fetching commands 93 from the descriptor buffer 83, and instead begins processing the protocol 91. When DECO 82 has finished processing the protocol 91, it resumes fetching commands 93 from descriptor buffer 83. As noted, the DK command 96 operates in a similar fashion to a protocol, in that when a DK command 96 is encountered, DECO 82 stops fetching commands 93 from the descriptor buffer 83, and instead begins processing the DK command 96 itself. According to an embodiment, at least some of the commands 93 and data processed by DECO 82 are received by DECO 82 in the form of software data structures referred to as descriptors (generally illustrated as descriptors 97 in FIG. 3). Descriptors 97 are initially created external to cryptographic processing module 30 and configured to process internet and/or communication packets. Descriptors 97 are generally configured to provide any number of functions related to data processing to cause DECO 82 and hardware protocol/command blocks to perform any number of different operations, such as, for example, RSA key-pair generation, RSA decryption, single-pass ESP-CBC tunnel, and various data packet processing functions. Descriptors 97 typically require that some cryptographic operation be performed as part of the descriptor 97.

Continuing to refer to FIG. 3, cryptographic processing module 30 is also shown having cryptographic hardware accelerator control block (CCB) 85. CCB 85 comprise memory locations (generally illustrated as registers 77) that have been set aside for storing various keys used by DECO 82 and/or cryptographic hardware accelerators 86 during the processing of data. In an embodiment, two registers, 71 and 72, are generally illustrated. In addition, two keys are generally illustrated (keys 74 and 75). Key 74 is shown located in register 71, and key 75 is shown located in register 72. In an embodiment, each of keys 74 and 75 are alphanumeric data. In alternative embodiments, CCB 85 may have more or fewer than two registers 77, and more or fewer than two keys may be stored in CCB 85. Keys stored in CCB 85 are used in cryptographic operations performed by various cryptographic hardware accelerators 86. It should be appreciated that in alternative embodiments, keys may also be stored in remote unsecured memory located external to cryptographic processing module 30, and brought into CCB 85 of cryptographic processing module 30 when needed. In this alternative embodiment, cryptographic processing module 30 also includes additional secure key processing circuitry to encrypt the original "plaintext" keys into cipherkeys prior to transmitting the keys to the unsecured remote storage location, and to decrypt the cipherkeys back into plaintext keys when the keys are brought back into cryptographic processing module 30 from an unsecured remote storage location for use in cryptographic processing module 30. CCB 85 further comprises a first-in, first-out (FIFO) buffer 73 to buffer information flowing into and out of CCB 85.

Cryptographic processing module 30 further comprises cryptographic hardware accelerators (CHAs) 86. As shown, a number of CHAs 86 are provided, each of which is configured to carry out cryptographic-related algorithms, including conventional cryptographic algorithms such as Advanced Encryption Standard (AES), based on information provided by CCB 85 and DECO 82. CHAs 86 are electrically coupled to DECO 82, CCB 85 and cross bar bus 89, and may operate on data provided from DECO 82, CCB 85, and/or cross bar bus 89. CHAs 86 are configured to complete a cryptographic algorithm on provided data when requested to do so by DECO 82, and to provide the results of the algorithm to DECO 82, registers 98 in local memory 87, CCB 85, and/or other devices or memory locations via crossbar bus 89 for subsequent use. In an embodiment, each CHA 86 is physically implemented in hardware using logic gates and other circuitry such that the algorithm performed by each CHA 86 is fixed once the CHAs 86 have been manufactured. In an alternate embodiment, each CHA 86 may be configured to alter the specific algorithm it performs based on information received from CCB 85 and/or DECO 82. Although CHAs 86 are generally illustrated being physically together and in the same general area as cryptographic processing module 30, it should be appreciated that in alternative embodiments, individual CHAs 86 may be separated and located in various locations, provided they are electronically coupled to DECO 82 and CCB 85.

As shown, one of the CHAs 86, designated RNG 90, is specifically configured to carry out a random number generation algorithm. Random number generator 90 is configured to generate one or more random numbers when requested to do so by DECO 82, and to provide the results of the random number generation to DECO 82, CCB 85, and registers 98 in local memory 87 for subsequent use. In an embodiment, random numbers having from a few hundred to a few thousand bits may be rapidly generated in this manner by RNG 90.

It should be appreciated that the cryptographic algorithms implemented by the CHAs 86 may cover a range in strength and in processing performance, where weaker cryptographic algorithms typically have faster performance, and stronger cryptographic algorithms typically have slower performance. CHAs 86 may be configured to implement any of a wide variety of different algorithms, such as, for example, AES, Data Encryption Standard (DES), triple Data Encryption Standard (3DES), and other cryptographic algorithms, such as hashing algorithms, which may not directly implement encryption or decryption processes, but which are nevertheless useful in cryptography.

Most, if not all, of the algorithms implemented by the CHAs 86 require that at least one key, control data, and payload data be provided to the CHAs 86 to allow the cryptographic algorithm to successfully complete. These elements (key, control data, and payload data) are made available to CHAs 86 in an embodiment directly via DECO 82, or indirectly via CCB 85, registers 98 and/or cross bar bus 89. Control data provided to CHAs 86 informs a given CHA 86 of operation parameters to use in performing that CHA 86's algorithm. The CHA 86 then uses keys stored in CCB 85 to perform its cryptographic algorithm on data (including payload data) stored in a register 98 and/or provided via DECO 82 or CCB 85. In an embodiment, CHA 86 is configured to perform a conventional symmetric encryption/decryption process such as the Advanced Encryption Standard (AES), using a key from a CCB 85. The cryptographic process is performed on data made available to CHA 86 by DECO 82, CCB 85 or from registers and/or memory to which CHA 86 is electrically connected.

In alternate embodiments, CHA 86 is configured to perform other algorithms, such as, for example, various secure hash algorithms (SHA-1, SHA-2), message digest algorithms (MD5), and hash-based message authentication code. These may further comprise cyclic redundancy check (CRC) functions, such as, for example, CRC32, CRC32C. These may still further comprise the Advanced Encryption Standard (AES) with key lengths of 128, 192 and 256 bits, and further comprise electronic code book (ECB), cipher block chaining (CBC), Public Key Hardware Accelerators (PKHA), Internet Protocol Security (IPSEC), secure sockets layer (SSL) and other cryptographic and packet-processing related algorithms.

Returning to DECO 82, as noted above, DECO 82 includes commands 93. One specific command is the KEY command 95. KEY command 95 is configured such that when KEY command 95 is decoded by DECO 82, KEY command 95 causes a key 74 to be loaded into a register 71 of registers 77 of CCB 85. In an embodiment, the key 74 is loaded into registers 71 of CCB 85 from a memory location of data processing system 10. In alternative embodiments, the keys may be loaded into registers 77 of CCB 85 from data provided to DECO 82 by a descriptor 97, or from other registers associated with data processing system 10. In determining the source and/or location of keys to be loaded into registers of CCB 85, KEY command 95 may utilize information provided by descriptor 97.

As noted above, DECO 82 also includes a DK ("derive key") command 96. The DK command 96 is configured to access an existing key ("original key") from a memory location and/or register, further process that key by, for example, applying a variety of modifier components to the original key, and store the resulting modified key (also known as a derived key) back in a memory and/or register location. In an embodiment, DK command 96 causes the derived key to be placed back into the original memory and/or register location from which the original key was retrieved, overwriting (replacing) the original key with the derived key. More specifically, referring to FIG. 3, DK command 96 retrieves a key from a memory location, processes the key to obtain a derived key, and places the derived key in one of registers 77 in CCB 85.

In an embodiment, a DK command 96 is present in a descriptor 97 being processed by DECO 82. In addition to being configured to process an original key to create and store a derived key, DK command 96 is further configured to overwrite itself with a KEY command 95 in the descriptor 97 that contains the DK command 96 being executed by DECO 82. As a result, all future processing of that descriptor 97 that had contained the DK command 96 will instead carry out the KEY command 95, retrieving the derived key rather than the original key. In an alternative embodiment, DK command 96 places the derived key in a memory and/or register location other than the memory and/or register location of the original key, and causes KEY command 95 that has replaced the original DK command 96 to point to the new memory and/or register location of the derived key. In another embodiment in which cryptographic processing module 30 is processing data frames 21 that include both key material and packet data, DK command 96 may update a pointer in DECO 82 to point to the beginning of the packet data in data frame 21 that is to be processed by cryptographic processing module 30. In still another alternate embodiment where cryptographic processing module 30 is processing data frames, DK command 96 may prefetch into a FIFO 73 of CCB 85 additional input packet data such that the packet data is readily available for processing by DECO 82 subsequent to key derivation.

Figure 4:
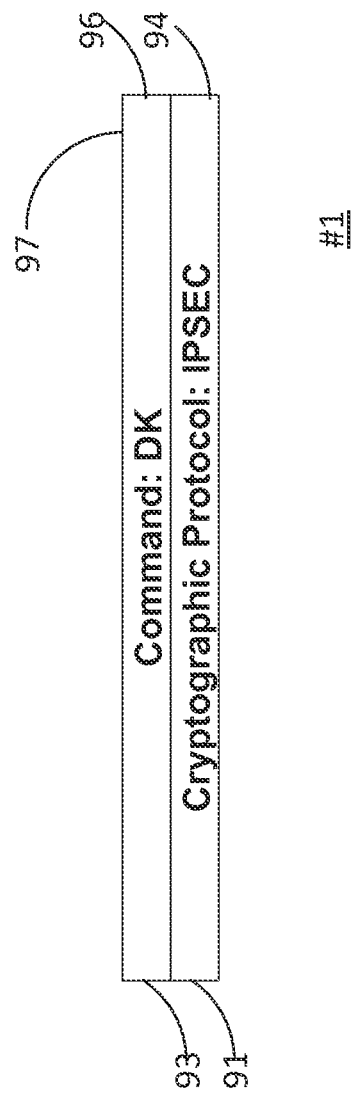
FIG. 4 shows a diagram #1 of a portion of a descriptor of the data processing device depicted in FIG. 1 prior to execution of a DK command.

FIG. 4 shows a diagram #1 of a portion of a descriptor 97 of the data processing device 10 depicted in FIG. 1 prior to execution of a DK command 96. The designation #1 indicates that FIG. 4 is illustrating a portion of descriptor 97 before a DK command 96 within the descriptor 97 has been processed. As noted above, descriptors 97 are data structures created external to cryptographic processing module 30 (FIG. 3) and configured to facilitate the processing of data, such as, for example, internet and/or communication packets. Descriptors 97 generally include both data and commands, and are stored at various memory locations in data processing system 10 (FIG. 1). Descriptors 97 are generally configured to provide any number of functions related to data processing, and may cause DECO 82 (FIG. 3), in conjunction with CCB 85 and CHAs 86 (FIG. 3), to perform any number of different operations, such as, for example, Rivest Shamir Adleman (RSA) key-pair generation, RSA decryption, single-pass encapsulating security payload (ESP) protocols, and various data and data packet processing functions and protocols. According to an embodiment, descriptors 97 typically include at least one cryptographic algorithm to be performed by the CHAs 86 as part of the descriptor 97.

Referring back to FIG. 3, descriptor 97 is shown loaded into descriptor buffer 83 of DECO 82. In an embodiment, descriptor 97 may also be present (not shown) in read-write memory 28 (FIG. 1) of data processing device 14. Thus, descriptor 97 may be present in read-write memory 28, and has been placed into descriptor buffer 83 of DECO 82 as a result of programmable processor 26 (FIG. 1) causing a copy of descriptor 97 to be loaded by cryptographic processing module 30 from read-write memory 28 (FIG. 1) into descriptor buffer 83 over data busses 24 and via interface controller 80. In an embodiment, descriptor 97 first passes through job queue 81 and over cross bar bus 89 before arriving in descriptor buffer 83 of DECO 82. In an alternative embodiment, descriptor 97 may be located in a memory location external to data processing module 14.

Referring back to FIG. 4, descriptor 97 includes information about where data (including, for example, packets of data) to be processed is located, information about where output is to be placed (memory and/or registers) after completion of descriptor 97, information about where keys to be used in any commands associated with descriptor 97 are located, information about the type of processing to be performed on the data, commands to be executed as part of descriptor 97, and commands to process specific protocols using the keys, data and other information associated with descriptor 97.

More specifically, as shown in FIG. 4, descriptor 97 is composed of multiple commands, including a first DK command 96 and a second command, cryptographic protocol command 91. Cryptographic protocol command 91 is configured to cause cryptographic processing module 30 to perform a specific cryptographic protocol on data associated with descriptor 97 utilizing the key resulting from the DK command 96. In an embodiment, cryptographic protocol command 91 is a protocol command IPSEC, configured to cause IPSEC protocol 94 to be performed on the data associated with descriptor 97, utilizing the key resulting from the DK command 96. In alternate embodiments, descriptor 97 may include additional information, such as, for example, pre-header data, header data, protocol data (including a protocol data block), in the descriptor. In alternate embodiments, descriptor 97 additional commands, including KEY commands 95, DK commands 96, may precede or follow DK command 96. Descriptor 97 may also further include multiple protocol commands 91.

In an embodiment, descriptor 97 causes DECO 82 to provide a derived key by means of DK command 96. When DECO 82 executes the DK command 96, DK command 96, using constants and other information contained in the DK command itself, causes an original key to be loaded into a register of CCB 85 from descriptor buffer 83, a memory location, or an input frame 21. The DK command 96 then causes a CHA 86 to be provided with information regarding the cryptographic algorithm to be performed on the original key, and causes the CHA 86 to perform the cryptographic algorithm and compute the derived key. In an embodiment, DK command 96 causes a CHA 86 to perform an HMAC algorithm on an original key stored in CCB 85 (FIG. 3). Once the original key has been processed to compute the HMAC, the new key (derived key) replaces the original key in CCB 85 at the same location in which the original key was stored. In an alternate embodiment in which a descriptor 97 will ultimately cause an Alleged RC4 (ARC-4) algorithm to be utilized, DK command 96 causes a CHA 86 to create derived keys in the form of substitution boxes (SBOX), and place the resulting derived keys into CHA 86 block that will be executing the ARC-4 algorithm, rather than placing the derived keys into registers in CCB 85. Once the derived keys have been created, DK command 96 also causes the original DK command 96 in descriptor 97 to be replaced (overwritten) with a KEY command 95 at all locations at which descriptor 97 is located, including both in descriptor buffer 83 (FIG. 3) and other memory locations at which descriptor 97 is located, such as for example, local memory 87 (FIG. 3).

Figure 5:
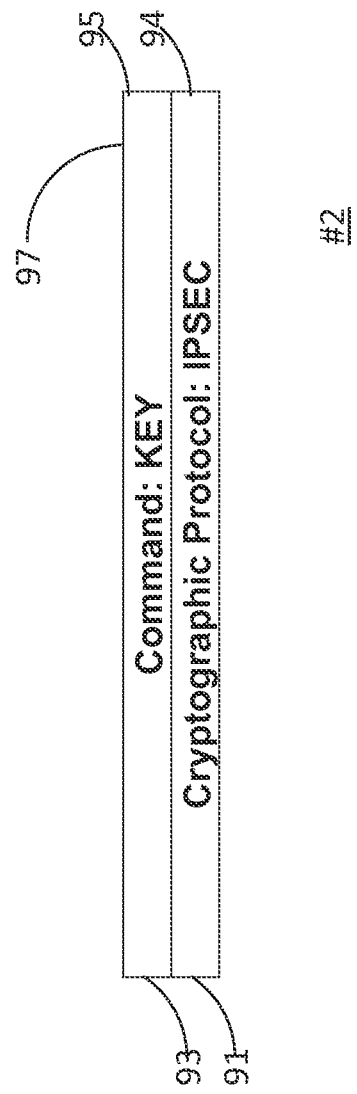
FIG. 5 shows a diagram #2 of a portion of a descriptor of the data processing device depicted in FIG. 1 following execution of a DK command.

FIG. 5 shows a diagram #2 of a portion of a descriptor 97 of the data processing device depicted in FIG. 1 following execution of a DK command 96. The designation #2 indicates that FIG. 5 is illustrating a portion of descriptor 97 AFTER a DK command 96 within the descriptor 97 of FIG. 4 has been processed, and the original DK command 96 (FIG. 4) has been replaced with a KEY command 95. Since the DK command has been completed, the next operation in descriptor 97 will be completed with execution of cryptographic protocol IPSEC 94, which processes a data packet associated with descriptor 97 using derived keys that have been loaded into registers 85.

Referring collectively to FIGS. 1-5, the data processing system 10 is configured to operate as follows, according to an embodiment. Programmable processor 26 of data processing device 14 is configured to create a plurality of descriptors 97 responsive to software instructions provided to programmable processor 26 via read-write memory 28. Descriptors 97 may be configured to carry out various protocols associated with data processing, including specifically packet processing protocols such as SSL, IPSEC and the like. Programmable processor 26 is further configured to store the created plurality of descriptors 97 in read-write memory 28. At least one of the descriptors 97 is configured as represented in FIG. 4 to carry out IPSEC operations on data frames 21. Programmable processor 26 of data processing device 14 is further configured to receive data, including specifically data frames 21, via busses 24, from input/output section 20 and other components 22. Programmable processor 26 is further configured, responsive to the receipt of data frames 21, to analyze data frames 21, and provide data frames 21, along with any descriptors 97 determined by programmable processor 26 to be necessary to process data frames 21, to cryptographic processing module 30.

Cryptographic processing module 30 is configured to receive the descriptors 97 and data frames 21 and process the data frames 21. More specifically, job queue 81 of cryptographic processing module 30 receives descriptors 97 and associated data via data busses 24 through interface controller 80. Job queue 81 is configured to analyze the descriptors 97 and prioritize the descriptors 97 for processing by DECO 82. Job queue 81 is further configured to provide prioritized descriptors 97 to DECO 82. DECO 82 is configured to process data and commands 93, including commands 93 in job descriptors 97, and is further configured to process protocols 91. DECO 82 receives prioritized descriptors 97 via cross bar bus 89 into descriptor buffer 83. Pointer register 79 of DECO 82 includes at least one pointer 78 that points to the next block of information contained in descriptor buffer 83 that is to be processed by DECO 82.

In an embodiment, descriptor 97 as generally illustrated in FIG. 4 is loaded into descriptor buffer 83. DECO 82 processes descriptor 97 by first processing DK command 96, which is configured, among other things, to create a derived key from an original key, and overwrite itself in descriptor 97 upon completion with the KEY command 95.

DK command 96 loads an original key from descriptor buffer 83, a memory location, or an input frame, and stores it into register 71 of CCB 85. DK command 96 then causes a CHA 86 to transform the original key into a derived key using a cryptographic algorithm, and causes the derived key to be placed back into register 71 of CCB 85, overwriting the original key. The derived key may also be stored into additional memory locations. DK command 96 is also configured to replace the DK command 96 in descriptor 97 currently being executed out of descriptor buffer 83 by DECO 82 with the KEY command 95. Furthermore, DK command 96 is also configured to replace DK command 96 in descriptor 97 in other memory locations in which the descriptor 97 is stored with the KEY command 95. DK command 96 furthermore updates a pointer in DECO 82 to point to the beginning of the packet data in data frame 21 that is to be processed by cryptographic processing module 30, and still further pre-fetches into descriptor buffer 83 additional input frame packet data such that the data is readily available for processing subsequent to completion of the DK command 96.

Upon completion of the DK command 96, DECO 82 then processes protocol command IPSEC 94 (FIG. 3), which causes the IPSEC 94 protocol to be processed using keys, including derived keys, that have been loaded into registers 77. The next time that descriptor 97 (initially shown in FIG. 4) is executed, it will have the form generally illustrated in FIG. 5, which shows that DK command 96 in descriptor 97 has been replaced with KEY command 95. Thus, when descriptor 97 (generally illustrated in FIG. 5) is executed, rather than executing the DK command 96 and deriving a new key, descriptor 97 will simply execute KEY command 95, loading a derived key 92 that has been previously loaded into key registers 77. All future instances of this specific descriptor 97 will take the form as generally illustrated in FIG. 5.

Figures 6, 7:
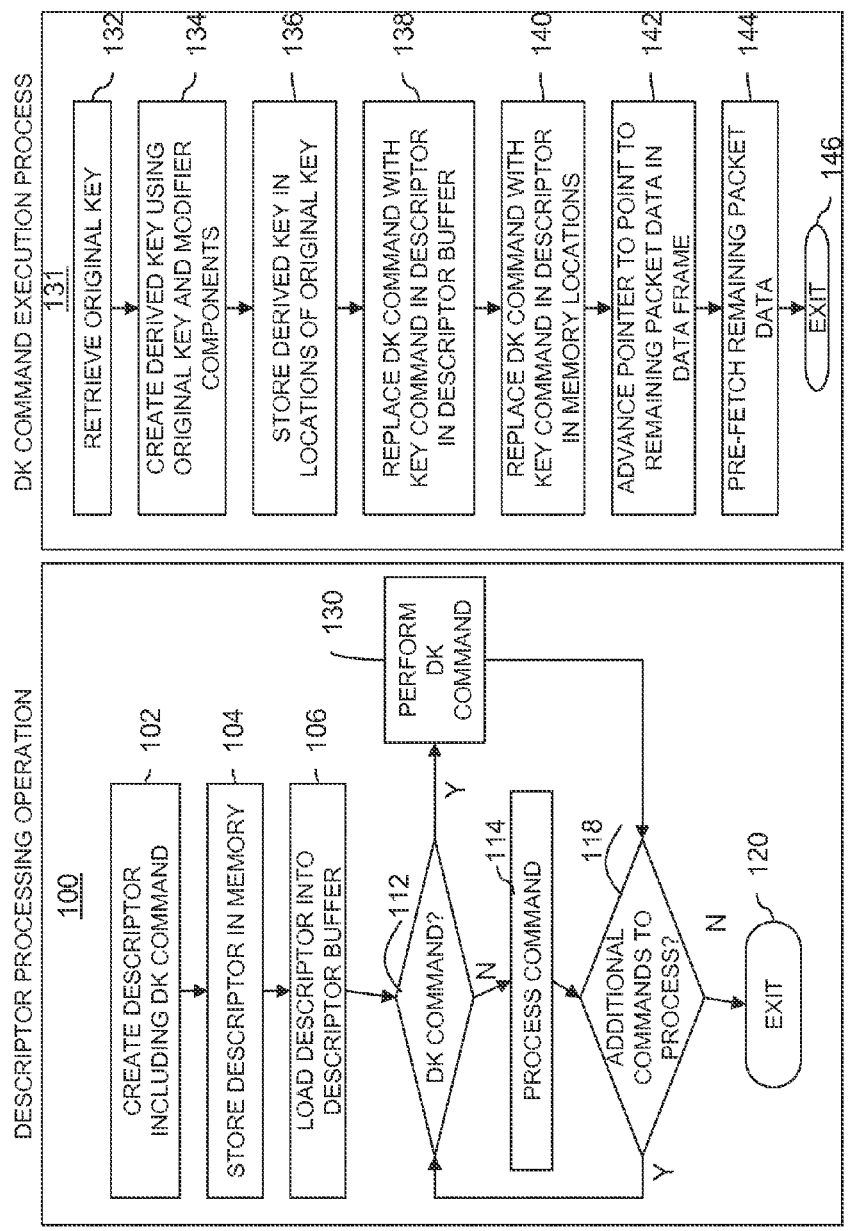
FIG. 6 shows a flow chart of an exemplary descriptor operation performed in the data processing system depicted in FIG. 1.
FIG. 7 is a flow chart illustrating an example of operations performed when a DK command is processed in the data processing system depicted in FIG. 1.

FIG. 6 shows a flow chart of an exemplary descriptor operation performed in the data processing system depicted in FIG. 1. Descriptor processing operation 100 may be performed in data processing system 10 (FIG. 1) in response to the execution of software programming instructions using components of data processing system 10, including components of cryptographic processing module 30, and possibly other components of data processing system 10. In particular, operation 100 may be invoked when a request is made within data processing system 10 for some sort of cryptographic operation with respect to data frames 21 (FIG. 1) received by data processing system 10.

Operation 100 includes a first operation 102 in which a descriptor 97 (FIG. 3) is created by data processing system 10 that includes at least one DK command 96. In a second operation 104, the descriptor 97 created in operation 102 is stored to a section of memory in data processing system 10. In a third operation 106, the descriptor 97 created in operation 102 and loaded into memory in operation 104 is loaded into the descriptor buffer 83 (FIG. 3) of DECO 82 (FIG. 3) of cryptographic processing module 30 (FIG. 3).

Fourth operation 112 is a query task to determine whether task 130 should be performed. In fourth operation 112, if a DK (derive key) command 96 is the next command to be processed the descriptor 97 located in descriptor buffer 83 (FIG. 3), operation 130 causes DK command 96 to be processed, placing a derived key in registers 77 (FIG. 3) or other locations for later use by the descriptor 97. After the DK command 96 has been processed at task 130, and a derived key placed into CCB 85 (FIG. 3), operation 100 continues with an operation 118.

If, on the other hand, a determination is made at query operation 112 that DK command 96 is NOT present, operation 100 proceeds directly to operation 114, in which a subsequent command is processed. At operation 118, a determination is made as to whether there are additional commands to be processed within the existing descriptor 97. If there are, operation 100 returns to operation 112 and continues from there. If there are not, operation 100 terminates with a operation 120 (Exit).

FIG. 7 is a flow chart illustrating an example of operations performed when a DK command is processed in the data processing system depicted in FIG. 1. More specifically, DK command execution process 131 illustrates operations performed when DK command 96 (FIG. 3) present in a descriptor 97 (FIG. 3, FIG. 6) located in descriptor buffer 83 (FIG. 3) of DECO 82 (FIG. 3) is processed, such as, for example, in operation 130 of FIG. 6. In a first operation 132, a key 74 (FIG. 3) is retrieved from a first location and placed in a register 71 (FIG. 3). In a second operation 134, key 74 is processed and altered using various modifier components, such that it is transformed into a derived key different from the original key 74. In a third operation 136, the derived key is stored in CCB 85 in register 71 (FIG. 3), and in the first location from which the original key 74 was obtained, overwriting the original key 74 with the derived key.

In a fourth operation 138, the original DK command 96 (FIG. 3), located in the descriptor 97 (FIG. 3, FIG. 7) present in the descriptor buffer 83 (FIG. 3) of DECO 82 (FIG. 3), is replaced (overwritten) in the descriptor buffer 83 with a KEY command 95 (FIG. 3). As a result, from that point forward, every time the descriptor 97 is processed by DECO 82, KEY command 95, rather than a DK command 96 (which is now no longer in the descriptor buffer 83), will be processed.

In a fifth operation 140, DK command 96 (FIG. 3), present in the descriptor 97 stored in local memory 87 (FIG. 3) is replaced (overwritten) with KEY command 95 (FIG. 3), and in all other memory locations in which descriptor 97 is located, such that every time thenceforth when the descriptor 97 is loaded from local memory 87 into descriptor buffer 83 (FIG. 3) of DECO 82 (FIG. 3), KEY command 95, rather than DK command 96, will be present.

In a next operation 142, pointer 78 (FIG. 3) a pointer in DECO 82 is advanced such that it points to the beginning location of packet data in a data frame 21 (FIG. 3) where additional packet data to be processed by DECO 82 is located. In a next operation 144, remaining packet data in data frame 21 (FIG. 3) to be processed by DECO 82 (FIG. 3) is loaded into the FIFO of CCB 85 (FIG. 3). At operation 146, DK command execution process 131 terminates.

Figure 8:
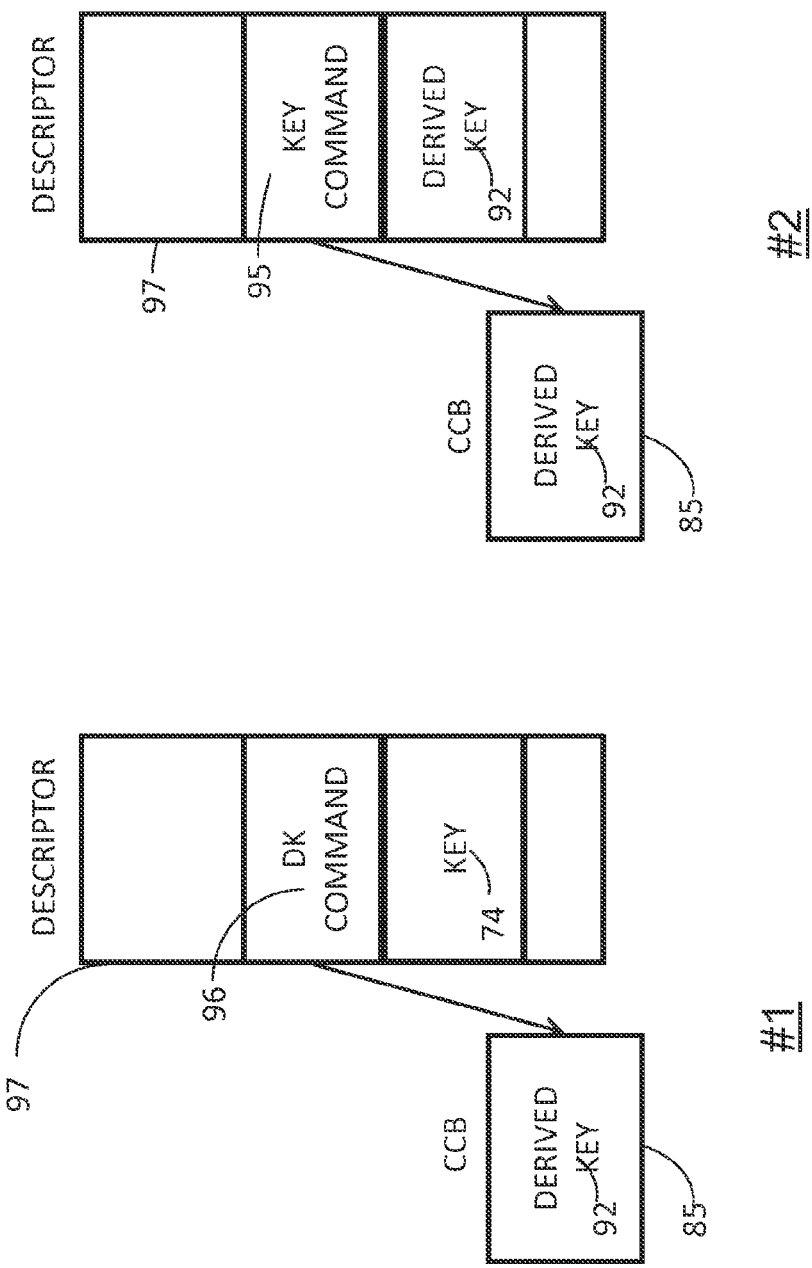
FIG. 8 show a simplified illustrative example in which a DK command is utilized; and, FIG. 9 shows an additional simplified illustrative example in which a DK command is utilized.

FIG. 8 shows a simplified illustrative example in which a DK command is utilized. In this illustrative example, a descriptor 97 initially includes a DK command 96, and a key 74, both of which are present in the descriptor 97. Processing of the DK command 96 causes a derived key 92 to be computed using the key 74, and further causes the derived key 92 to be stored into a register of CCB 85 (#1). Subsequent to the computation of the derived key 92, processing of the DK command 96 further causes the DK command 96 to be replaced in the descriptor 97 with the KEY command 95, and causes the derived key 92 to replace the key 74 in descriptor 97 (#2), and in additional memory locations in which the key 74 may be located. The next time that the descriptor 97 is processed, the KEY command 95 will be executed, and will utilize the derived key 92.

Figure 9:
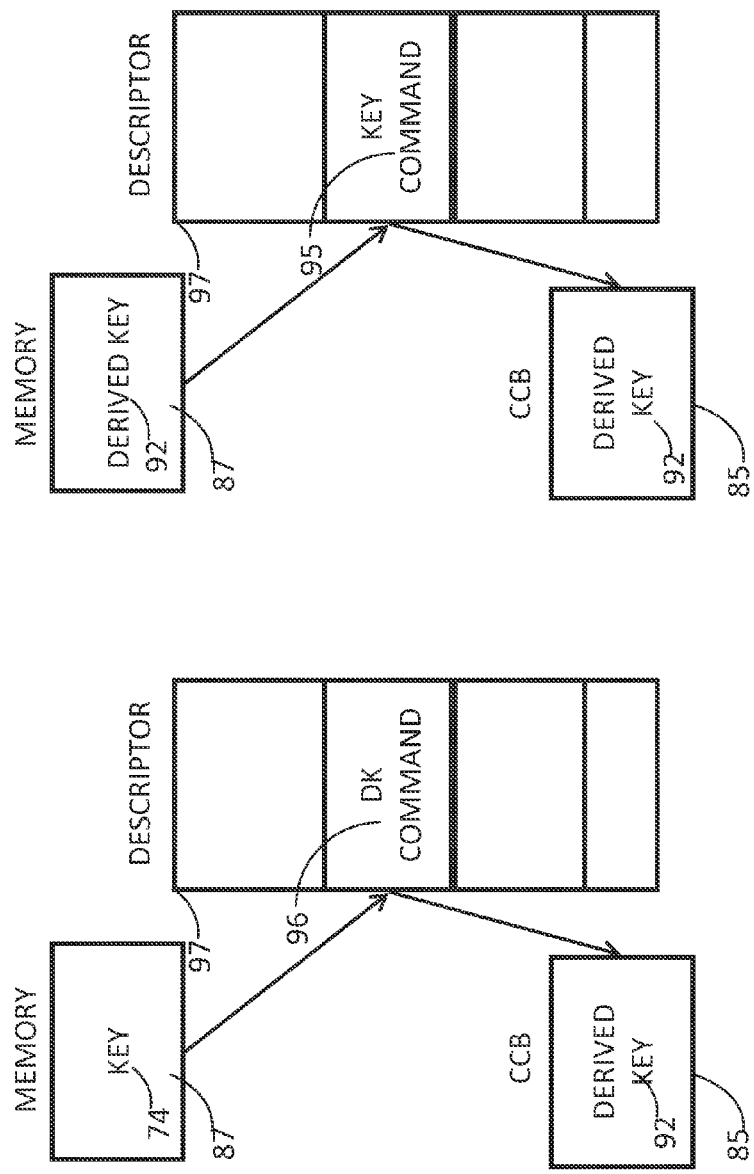

FIG. 9 shows an additional simplified illustrative example in which a DK command is utilized. In this illustrative example, a descriptor 97 initially includes a DK command 96. A key 74 is located in memory 87. Processing of the DK command 96 causes a derived key 92 to be computed using the key 74 located in memory 87, and further causes the derived key 92 to be stored into a register location of CCB 85 (#1). Subsequent to the computation of the derived key 92, processing of the DK command 96 further causes the DK command 96 to be replaced in the descriptor 97 with the KEY command 95, and causes the derived key 92 to replace the key 74 in memory 87 (#2). The next time that the descriptor 97 is processed, the KEY command 95 will be executed, and will utilize the derived key 92.

Referring back to FIG. 3, in an alternate embodiment, a descriptor 97 is provided to DECO 82 including a DK command 96. In this alternate embodiment, the DK command 96 includes information about a cryptographic algorithm to be performed using a key, and information about the length of the original key from which the DK command 96 is to compute a derived key. In this alternate embodiment, the DK command 96 is further configured to determine if the original key is of a required length to support the cryptographic algorithm. If the DK command 96 determines that the key is not of the correct length, the DK command 96 is configured to cause a CHA 86 to compute a cryptographic hash of the original key to produce a hashed key that is of the proper length required for the cryptographic algorithm, and to store the hashed key in a register of CCB 85. DK command 96 is then configured to further compute a derived key from the hashed key as though it were an original key as described further above. In effect, in this embodiment, DK command 96 is configured to derive two keys—the first being a hashed key, and the second being a derived key. In an embodiment, the second key (derived key) may itself be a cryptographic hash of the first hashed key.

In summary, an embodiment provides an improved data processing apparatus and method. The apparatus and method provides for more efficient processing of data by streamlining the process by which keys are altered, stored and retrieved during data processing operations. An embodiment allows keys to be generated and altered one time during a first execution of a data processing protocol, such that the derived keys are readily available during subsequent executions of that protocol. Because the derived keys need not be created and altered during subsequent iterations of the protocol, and need only be retrieved, subsequent iterations of that protocol can complete much more quickly, improving the flow of data through the data processing apparatus. In addition, because the keys have already been created and altered, overhead associated with handshaking among components of the data processing apparatus during key creation and alteration is reduced. Finally, because the apparatus includes hard-wired commands to carry out the complex key alteration process, software written to carry out various protocols is streamlined.

A data processing device comprising a cryptographic accelerator, memory, a processor, and derive key circuitry configured to derive a key responsive to a derive key command and subsequently replace the derive key command with a different command, is provided. The processor is configured to receive commands and process the derive key command. The derive key circuitry is configured, responsive to the derive key command, to cause the cryptographic accelerator to retrieve a first key, alter the first key to create a derived key, place the derived key in a location, and subsequent to the creation of the derived key, replace the derive key command with a second command other than a derive key command. Methods of cryptographically processing data in a data processing system are also provided. A method is provided including the operations of processing a derive key command in a data processing system, retrieving an original key responsive to the processed derive key command, processing the original key to create a derived key from the original key, storing the derived key in said data processing system, and replacing the derive key command with a command different from the derive key command. A method is also provided including the operations of receiving a first sequence of commands, including a first command configured to alter a key and a second command configured to process data, retrieving an original key responsive to the first command, processing the original key to create a derived key from the original key responsive to the first command, storing the derived key in said data processing system responsive to the first command, and replacing, in the first sequence of commands, the first command, with a third command configured to retrieve the derived key.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A data processing device comprising:
a cryptographic accelerator;
a key register configured to store keys;
a first processor comprising derive key circuitry, said derive key circuitry configured to derive a key responsive to a derive key command and subsequently replace the derive key command with a different command, said first processor further comprising
a buffer configured to store at least a first descriptor, the descriptor having a first set of commands, including a derive key command, and data to be processed by the first set of commands
wherein said first processor is electronically coupled to said cryptographic accelerator and said key register, and wherein said first processor is configured to receive the first set of commands from said buffer and process the first set of commands, including the derive key command, and wherein said derive key circuitry is configured, responsive to the derive key command processed by said first processor, to cause said cryptographic accelerator to retrieve a first key from a first location in said key register and alter the first key to create a derived key from said first key, and wherein said derive key circuitry is further configured to place the derived key in a location in the key register, and subsequent to the creation of the derived key, replace the derive key command in the first set of commands in the first descriptor in said buffer with a second command other than a derive key command.

2. A data processing device as claimed in claim 1, further comprising memory in electrical communication with said first processor configured to store descriptors having commands and data to be processed by those commands, said memory having the first descriptor including a derive key command stored therein, wherein said derive key circuitry is further configured, responsive to the derive key command, to also replace the derive key command in the first descriptor in the memory with the second command other than a derive key command.

3. A data processing device as claimed in claim 2 further comprising a second processor coupled to said memory and said first processor, wherein said second processor is configured to evaluate data received into said data processing device, create descriptors including sets of commands including derive key commands for processing the data, commands requiring the use of cryptographic accelerators, and data to be processed by those commands, and store the created descriptors including the sets of commands in said memory.

4. A method of cryptographically processing data in a data processing system comprising:
retrieving into a buffer from a first memory location of a data processing system, a descriptor having both a first command portion comprising a derive key command and a second data portion having data to be processed by commands in the first command portion;
processing the derive key command of the descriptor in a processor of the data processing system;
retrieving an original key from a key storage memory location of said data processing system responsive to the processed derive key command;
processing the original key in the processor of said data processing system to create a derived key from the original key responsive to the derive key command;
storing the derived key in a key storage memory location of said data processing system responsive to the derive key command; and
replacing the derive key command in the first command portion of the descriptor in the buffer and in the first memory location of said data processing system with a command different from the derive key command,
wherein the method is performed by at least one hardware processor.

5. A method as claimed in claim 4, further comprising the step of cryptographically processing in said data processing system, utilizing the derived key, data in the second data portion of the descriptor.

6. A method as claimed in claim 4, wherein the key storage memory location is a register, and wherein the original key is retrieved from the register in said data processing system, and wherein the storing operation includes storing the derived key in the register from which the original key was retrieved, overwriting the original key.

7. A method as claimed in claim 6, wherein the original key is also located in an additional memory location other than the register, further comprising the step of storing the derived key in the additional memory location, overwriting the original key located in the additional memory location.

8. A method as claimed in claim 4, further comprising the steps of incrementing a pointer in a data frame to point to packet data in the data frame, responsive to the derive key command, and storing the packet data pointed to by the pointer in a FIFO, responsive to the derive key command.

9. A method as claimed in claim 4, wherein the derive key command is provided in a descriptor also comprising at least one cryptographic command, and wherein, the replacing operation includes replacing the derive key command in the descriptor.

10. A method as claimed in claim 9, further comprising the steps of storing the descriptor in a memory location of the data processing system, and wherein the replacing operation includes replacing the at least one derive key command in the descriptor in the memory location.

11. A method of cryptographically processing data in a data processing system having a buffer, a processor, and key memory, comprising:

receiving and storing in the buffer of the data processing system a first sequence of commands and data to be processed by the commands, the first sequence of commands including a first command configured to alter a key and a second command configured to process data;

processing, in the processor of the data processing system, the first command configured to alter a key;

retrieving an original key, responsive to the first command, from the key memory of the data processing system;

processing the original key to create a derived key from the original key responsive to the first command;

storing the derived key in the key memory of said data processing system responsive to the first command; and replacing, in the first sequence of commands in the buffer of the data processing system, the first command, with a third command configured to retrieve the derived key, wherein the method is performed by at least one hardware processor.

12. A method as claimed in claim 11, wherein the first sequence of commands and data is located in a job queue of the data processing system in addition to being located in the buffer, and wherein the replacing operation includes replacing the first command in the job queue of said data processing system.

13. A method as claimed in claim 11, wherein the first sequence of commands and data is located at an additional memory location in addition to the buffer, and wherein the replacing operation includes replacing the first command in the additional memory location of said data processing system.

14. A method as claimed in claim 11, wherein the replacing operation includes replacing the first command at every memory location in which the first sequence of commands occurs in said data processing system.

15. A method as claimed in claim 11, wherein the second command in the first sequence of commands and data is a cryptographic command configured to cryptographically process data of said data processing system, the method further comprising the step of cryptographically processing a first set of data in the first sequence of commands and data in said data processing system using the derived key, responsive to the cryptographic command, to encrypt or decrypt the first set of data.

16. A method as claimed in claim 15, further comprising the steps of processing the first sequence of commands at least one additional time in the processor of said data processing system, retrieving the derived key from said data processing system responsive to the third command, and cryptographically processing a second set of data in said data processing system using the derived key responsive to the cryptographic command.

17. A method as claimed in claim 11, further comprising the step of advancing a pointer in said data processing system, responsive to the first command, to point to data in a data frame to be processed by the cryptographic command.

18. A method as claimed in claim 17 further comprising the step of loading the data in the data frame to which the pointer points into a FIFO for processing by the cryptographic command, responsive to the first command.

19. A method as claimed in claim 11, wherein the original key is contained in the first sequence of commands and data in a memory location in which the first sequence of commands and data are stored, and wherein, as a result of the replacing operation, the derived key overwrites the original key in the first sequence of commands and data in the memory location in which the first sequence of commands and data are stored, replacing the original key in the first sequence of commands and data with the derived key.

20. A method as claimed in claim 19, wherein the original key is also present in at least one additional memory location, and wherein, as a result of the replacing operation, the derived key is also stored in the at least one additional memory location, replacing the original key.

* * * * *